Dec. 24, 1957 R. B. GRAY 2,817,242
VARIABLE RATIO DRIVE
Filed Nov. 26, 1954

INVENTOR.
Robert B Gray
BY
Ralph Hammar
attorney

United States Patent Office 2,817,242
Patented Dec. 24, 1957

2,817,242

VARIABLE RATIO DRIVE

Robert B. Gray, Erie, Pa., assignor to American Meter Company, Incorporated, Erie, Pa., a corporation of Delaware Application November 26, 1954, Serial No. 471,334

4 Claims. (Cl. 74—191)

Because of the change in volume of gas with changes in temperature, the heat units in a cubic foot of gas are less in summer when the gas is less dense and greater in winter when the gas is more dense. Accordingly, the conventional gas meter which measures in cubic feet does not measure the heat units. This invention is intended to provide a temperature compensation for the meter register so the registration will be proportional to the heat units of the gas. Since the compensation is introduced in the register, no changes are required in the meter. In a preferred form, the meter register is driven by a double cone friction drive with magnetized drive wheels bearing on cone drive pulleys of magnetic material. A thermostatic element positions the drive pulleys so the meter register is driven at a speed corresponding to the volume of gas at standard temperature i. e. 60° F. rather than to the volume of gas at the actual temperature.

Figure 1:
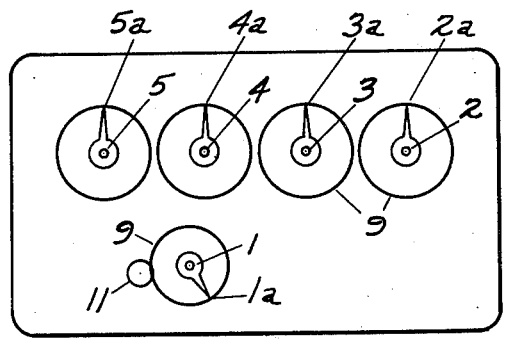
Figure 3:
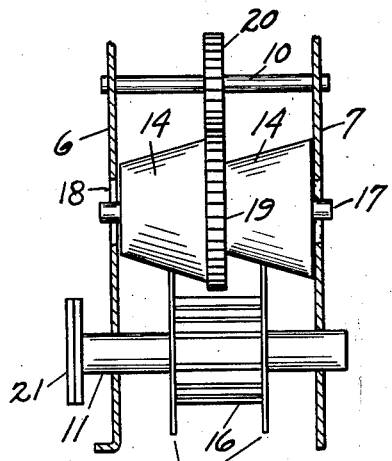
Figure 2:
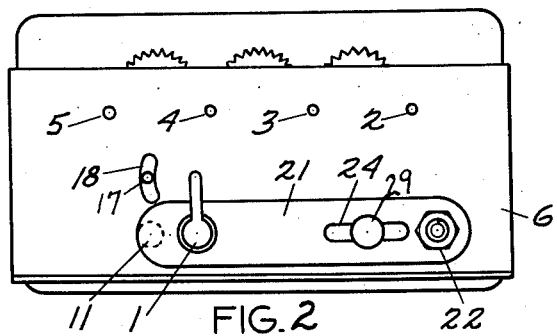
Figure 4:
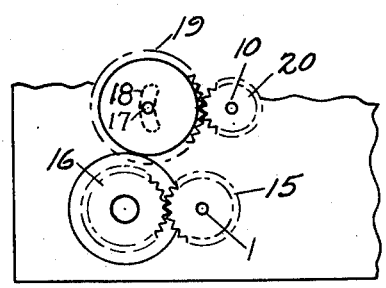
Figure 5:
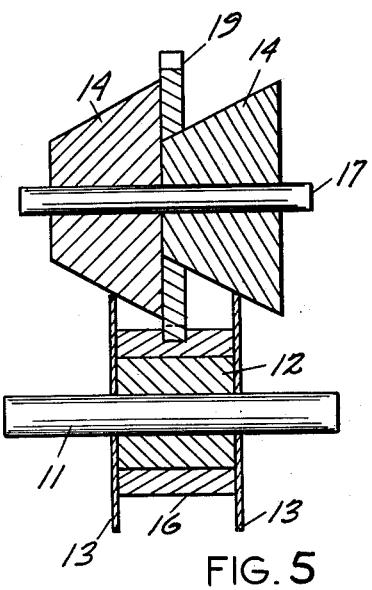
Figure 6:
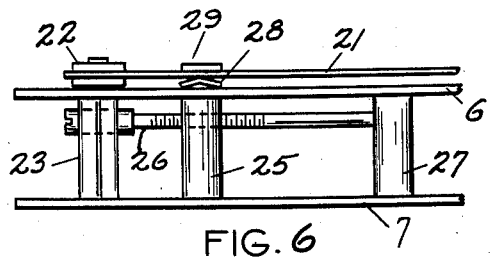

In the drawing, Fig. 1 is a front view of a gas meter register, Fig. 2 is a back view, Fig. 3 is a diagrammatic section through the drive to the meter register, Fig. 4 is a diagrammatic section through the drive to the meter register at right angles to Fig. 3, Fig. 5 is an enlarged section through the magnetic drive pulleys, and Fig. 6 is a detail of the adjustment for the thermostatic element.

Fig. 1 of the drawing is a front view of a register such as used for gas meters, where 1 indicates the output shaft driven by the gas meter in the usual manner and 2, 3, 4 and 5 indicate the totalizing shafts driven by the usual gearing and having a decimal relation to each other so that the accumulated total of gas flowing through the meter is indicated by the position of hands 2a to 5a inclusive fixed to the correspondingly numbered shafts. The reduction gearing between the shaft 1 and the shafts 2 to 5 inclusive is carried in a frame comprising spaced plates 6 and 7, the plate 7 being the front of the register and having fixed thereto a face plate 8 carrying the dials 9 for the pointers 1a to 5a inclusive. The parts so far described are or may be of common construction and further illustration is not required for the purposes of the present application.

In the conventional gas meter there is a direct drive from the shaft 1 to the totalizing shafts 2 to 5 inclusive so that the totalizing shafts indicate the actual volume of the gas being measured. Since the volume of the gas varies with its temperature, the volume registered does not indicate the heat value of the gas. Gas in the summer, which has a higher temperature, is less dense and has a relatively lower heat value than gas in the winter which is more dense. In order that the registration may correctly reflect the heat value of the gas, it is proposed to introduce between the shaft 1, driven by the gas meter and the totalizing shafts 2 to 5, a variable ratio drive which will drive the shafts 2 to 5 inclusive at a speed proportional to the volume the gas being measured would have at a standard or reference temperature i. e. 60° F. rather than at a speed proportional to the actual volume of the gas being measured. Since this correction of the temperature for the gas being measured is introduced between the shaft 1, driven by the meter, and the totalizing register shafts 2 to 5 inclusive, the volumetric accuracy of the meter or its proof can be checked at any temperature. In the preferred form of the invention illustrated, this variable speed drive is introduced between the shaft 1, driven by the meter, and the shaft 10 which through the usual gear train drives the totalizing shafts 2 to 5 inclusive. Both of the shafts 1 and 10 are journaled on fixed axes in the end plates 6 and 7 of the register frame.

The variable ratio drive comprises a non-magnetic shaft 11 journaled on a fixed axis in the end plates 6 and 7 and axially slidable in the end plates. On the shaft is a permanent magnet 12 having at opposite ends disks 13 of soft iron which serve as pole shoes for the magnet and also as friction drive pulleys cooperating with a double cone driven pulley 14. The shaft 11 is rotated by the shaft 1 through a gear 15 fixed to the shaft 1 which meshes with a gear 16 fixed to the shaft 11 and surrounding the magnet 12. The speed of rotation of the shaft 11 accordingly is directly proportional to the speed of the shaft 1 driven by the meter. The double cone drive pulley 14 which is of magnetic material is fixed to a shaft 17 having a fixed axial position between the plates 6 and 7 but free to move up and down by reason of arcuate slots 18 in the plates 6 and 7 which are centered on the axis of the shaft 10 so that a gear 19 fixed to the double cone drive pulley always meshes properly with a gear 20 fixed to the shaft 10 which drives the totalizing shafts of the register. It is apparent that the double cone pulley 14 will be biased by gravity into contact with the drive pulleys 13 on the shaft 11 so that contact will always be maintained as the shaft 11 is moved axially. Moving the shaft 11 changes the radius of contact between the pulleys 13 and 14 and accordingly changes the ratio of the drive between the shafts 1 and 10.

In order that the ratio of the drive between the shafts 1 and 10 may be proportional to the ratio of the volume the gas being measured would have at a standard or reference temperature to the volume the gas actually has at the temperature at which it is being measured, a thermostatic element 21 is fixed to one end to the frame 6 and has its free end bearing on the shaft 11 as is apparent from Figs. 2 and 3. When the volume of the gas being measured is higher than the volume the gas would have at the standard or reference temperature, the thermostat 21 moves the shaft 11 to the right as viewed in Fig. 3 thereby decreasing the ratio of the drive between the shafts 1 and 10. When the volume of the gas being measured is less than it would be at the standard or reference temperature the thermostat 21 moves to the left as viewed in Fig. 3 thereby permitting the shaft 11 to move to the left and to increase the ratio of the drive between the shafts 1 and 10. By this arrangement, it is obviously possible to completely compensate for variations in the density of the gas being measured so that the totalizing shafts 2 to 5 inclusive will always indicate the volume of the gas at the standard or reference temperature regardless of what the actual volume may be. At the same time, there is no need to make any changes in the meter because the accuracy of the meter in terms of actual cubic feet is always correctly indicated by the rotation of the shaft 1. This means that any adjustments necessary to correct the accuracy of the meter can be made at any temperature.

For the purpose of calibration, the bi-metal thermostatic element 21 is fixed by a nut 22 to a post 23 between the end plates 6 and 7. In the thermostatic element there is a slot 24 slidably receiving an adjustable abutment 25 threaded on an adjusting screw 26 between the post 23 and a post 27 likewise fixed between the end plates 6 and 7. By turning the adjusting screw 26, the abutment member 25 is moved axially along the slot 24. A washer 28 arranged between the plate 6 and the bi-metal thermostatic element 21 holds it firmly against the head 29 on the abutment member. This means that the effective length of the bi-metal is that between its free end and the head 29 on the abutment member so that the movement of the bi-metal under changes in temperature can be adjusted by the adjusting screw 26. This is a calibrating adjustment.

Because the bi-metal 26 merely bears against the end of the shaft 11 projecting through the end plate 6, it is necessary that the shaft be always held in contact with the bi-metal so that the position of the shaft 11 will always correspond to the position of the bi-metal. This conveniently is accomplished by having the shafts 11 and 17 slightly out of parallel so that the pulleys 13 are not precisely at right angles to the shaft 17. Then in one direction of rotation, there is a force tending to move the shaft 11 to the right while in the opposite direction of rotation, there is a force tending to move the shaft 11 to the left. In the present construction, the direction of rotation of the shaft 1 is such that the force on shaft 11 is to the left and keeps the shaft in contact with the thermostatic bi-metal member 21. The shafts 11 and 17 need be only slightly out of parallel in order to accomplish this result. The force is like that obtained by turning the front wheels of an automobile for steering.

While the drive between the pulleys 13 and the double cone pulley 14 is a friction drive, the contact between these pulleys is due to the magnetic flux from the magnet 12 which flows through the pole shoes or pulleys 13 and through the magnetic double cone pulley 14. This permits the use of smooth driving surfaces on the pulleys 13 and 14 which can have sufficient hardness so that there will be negligible wear and accordingly negligible change in the ratio of the drive with use. There is a slight loss in this drive due to magnetic hysteresis but this is negligible. There is no slippage between the pulleys 13 and 14 which is obviously an important feature.

In order that the magnetic flux be confined to the magnet 12 and the pulleys 13 and 14, the other parts namely the shafts 11 and 17 and the gears 16 and 19 as well as the end plates 6 and 7 are made of non-magnetic material.

What I claim as new is:

1. A variable ratio drive having driving and driven members, one member comprising a pair of coaxial spaced friction disc pulleys and the other member comprising a double coned pulley with the cones end to end and sloped in the same direction, a gear carried by the double coned pulley, a mating gear, means supporting the first member for rotation on and for axial movement along a fixed axis, means supporting the other member for rotation on its axis and for movement of its axis in an arc centered on said mating gear, and control means for moving said first member along its axis to vary the ratio of the drive between said first member and said mating gear.

2. The construction of claim 1 in which the double cone pulley and the pair of friction pulleys are of magnetic material and further including a magnet arranged to pass magnetic flux through the contacting friction surfaces of the pulleys to maintain the same in driving contact.

3. A variable ratio drive comprising a frame having spaced members, driving and driven shafts journaled in and bridging the space between said frame members, a gear on one of the shafts, a drive between the shafts comprising double cone pulley with the cones end to end and sloped in the same direction and a pair of friction pulleys each engaging one of the cones of the double cone pulley, a gear on the double cone pulley mating with the gear on said one shaft, a shaft for the double cone pulley, guide slots in the frame members for the double cone pulley shaft centered on the axis of said one shaft, a shaft for the pair of friction pulleys journaled in and axially slidable crosswise of the frame members, and means for changing the axial position of the shaft for the pair of friction pulleys to vary the relative position of the pair of friction pulleys with respect to the double cone pulley to change the ratio of the drive.

4. A variable ratio drive having driving and driven members, one member comprising a pair of coaxial spaced friction disc pulleys and the other member comprising a double coned pulley with the cones end to end and sloped in the same direction, a gear carried by the double coned pulley, a mating gear, means supporting the first member for rotation on and for axial movement along a fixed axis, means supporting the other member for rotation on its axis and for movement of its axis in an arc centered on said mating gear, the axes of said driving and driven members being skewed relative to each other out of parallel so the pulley driving force exerts an axial force on the first member, a control member having a thrust surface receiving said axial force, and means for moving the thrust surface of said control member axially to vary the ratio of the drive between said first member and said mating gear.

References Cited in the file of this patent
UNITED STATES PATENTS

| | | |
|---|---|---|
| 2,167,641 | Dewan | Aug. 1, 1939 |
| 2,222,551 | Ziebolz et al. | Nov. 19, 1940 |
| 2,273,121 | List | Feb. 17, 1942 |
| 2,348,593 | Beitler | May 9, 1944 |
| 2,505,521 | Boyajian | Apr. 25, 1950 |
| 2,650,414 | Kreamer | Sept. 1, 1953 |

FOREIGN PATENTS

| | | |
|---|---|---|
| 829,332 | France | Mar. 28, 1938 |
| 855,786 | Germany | Nov. 17, 1952 |